United States Patent [19]
Streckert
[11] 4,168,566
[45] Sep. 25, 1979

[54] APPARATUS AND METHOD FOR NAILING AND NESTING PALLETS

[76] Inventor: Thomas E. Streckert, P.O. Box 453, Abbotsford, Wis. 54405

[21] Appl. No.: 848,920

[22] Filed: Nov. 7, 1977

[51] Int. Cl.$^2$ .............. B23P 11/00

[52] U.S. Cl. .............. 29/432; 29/772; 227/45

[58] Field of Search .............. 29/432, 430, 772; 227/4, 45, 50, 99, 100, 152

[56] References Cited

U.S. PATENT DOCUMENTS

| | | | |
|---|---|---|---|
| 3,195,793 | 7/1965 | Hadnagy | 227/45 |
| 3,557,439 | 1/1971 | Dykeman | 29/772 |
| 3,706,408 | 12/1972 | Burch | 227/100 |
| 3,755,871 | 9/1973 | Nelson, Jr. | 29/772 |
| 3,968,560 | 7/1976 | Vial | 29/772 |
| 4,039,111 | 8/1977 | Rogers | 227/152 |
| 4,054,236 | 10/1977 | Paxton | 227/50 |

*Primary Examiner*—Lowell A. Larson
*Attorney, Agent, or Firm*—Williamson, Bains, Moore & Hansen

[57] ABSTRACT

A nailing machine is utilized in conjunction with particular conveying apparatus and an associated processing system to nail deck boards to stringer beams transversely thereof so as to manufacture either single or double deck wooden pallets. Conveyors are mounted on either side of the nailing machine in such a way as to permit contact elements thereon to readily engage the lead stringer beam of either single or double deck pallets under construction and index them forwardly to predetermined positions where additional stringer beams are nailed in place to deck boards.

For making double deck pallets, half pallets having a first deck thereon are side fed with their stringer beams up into an input position on the input side of a nailing machine adjacent to a deck board hopper. A single pusher operates to simultaneously deliver a second set of deck boards from the hopper and a half pallet from its input position into the nailing machine for the nailing of the second set of deck boards in place.

Preferably, the same nailing machine is used to nail both the top and bottom decks on double deck pallets. Half pallets having a first deck nailed in place by a nailing machine are flipped over with their stringer beams up and their deck boards lying thereunder and returned by conveying apparatus to the aforesaid input position on the input side of the same nailing machine.

20 Claims, 8 Drawing Figures

APPARATUS AND METHOD FOR NAILING AND NESTING PALLETS

BACKGROUND OF THE INVENTION

Nailing machines comprised of a plurality of reciprocating nailing heads disposed above an anvil have been in use for some time for nailing deck boards to stringer beams to form either single or double deck pallets. However, the conveying mechanisms utilized with such machines have been unduly cumbersome and inefficient. Traditionally, special jigs have been utilized to hold stringer beams and deck boards in proper position for nailing, and conveyors have been provided to engage the jigs and pull them through the nailing machines as spaced stringer beams are successively nailed to deck boards. The manual loading of stringer beams and deck boards into such jigs is a time consuming, inefficient process. See, for example, U.S. Pat. No. 3,557,439 and the description of prior art are set forth therein. The pallet assembling system of this patent requires two nailing machines with a first deck being nailed in place to stringer beams in a first machine and a second machine being utilized to nail a second set of deck boards in place after the half pallet is turned over.

U.S. Pat. Nos. 3,591,067 and 3,552,624 disclose particular jig assemblies for supporting the stringers and deck boards of a pallet in position for nailing in a nailing machine. It can be readily appreciated that the assembly jigs and conveying devices of these two patents do not lend themselves to the handling of a so-called half pallet having one set of deck boards in place, for nailing a second set of deck boards to the same stringer beams to complete a double deck pallet. The stringer holding devices utilized in conjunction with the jigs of these patents would interfere with the handling and nailing of a half or partially completed pallet having one set of deck boards already nailed to stringers.

U.S. Pat. No. 3,755,871 discloses that partial or half pallets may be placed in the same basic nailing machine by hand, and U.S. Pat. No. 3,539,087 discloses side mounted conveyor chains to pull a jig holding stringers and deck boards through a nailing machine. However, there is no known prior art nailing apparatus or procedure which can accomplish the automatic processing of either single or double deck pallet components into and through the same nailing machine. It is with these shortcomings in mind that the pallet nailing apparatus and method disclosed herein have been developed.

BRIEF SUMMARY OF THE INVENTION

The pallet nailing system of this invention is particularly characterized by conveying and handling apparatus and associated controls effective to automatically feed stringer beam and deck board components into and through the same nailing machine for the nailing of either the first deck or second deck in place to make either single or double deck pallets.

For the processing of single deck pallets, a nesting machine is provided which automatically nests a pair of single deck pallets in opposed relation with their stringer beams tightly nested together in vertically overlapping relation.

As a particularly effective means to assist in accomplishing the foregoing objectives, a pair of endless conveyors are mounted on opposite sides of a nailing machine. The conveyors move in horizontal planes about vertical drive axes and carry contact elements in the form of lugs movable into position to directly engage the opposite ends of the lead stringer beam of a pallet under construction. After deck boards are nailed to the lead stringer beam, the side conveyors are automatically actuated and the contact lugs thereon engage the rear face of the lead stringer beam at the opposite ends thereof and carry it forward intermittently with its attached deck boards to predetermined positions where the nailing machine is again actuated to nail the deck boards to successive stringer beams.

Advantageously, control means in the form of a plurality of switch devices are provided at spaced apart locations in the direction of pallet travel on the output side of the nailing machine and are responsive to contact by the lead stringer beam at predetermined positions thereof to intermittently stop the side conveyors at predetermined locations of the deck boards for successive nailing of additional stringer beams thereto.

No assembly jigs are utilized to hold the stringer beams and deck boards in place in the nailing machine. In the process of nailing a first or single set of deck boards in place, stringer beams are automatically placed one at a time in the nailing machine, under the deck boards, against a retractable stop which positions the stringer beams for nailing. The engagement of the lead stringer beam at its opposite ends by the contact elements on the side mounted conveyors avoids any interference with the first set of deck boards of a half pallet being carried through the nailing machine for the nailing of a second set of deck boards in place.

A further advantageous feature of the pallet nailing and handling apparatus of this invention resides in the utilization of a single pushing means to automatically deliver a second set of deck boards and a half pallet with a first deck in place thereon into a nailing machine for the attachment of the second set of deck boards to make a double deck pallet. To this end, an elongated pusher is positioned adjacent a deck board hopper on the input side of a nailing machine, the pusher having deck board engaging segments which strip a set of laterally spaced deck boards from the bottom of the hopper and carry them into nailing positions in the nailing machine. Separate contact means on the pusher simultaneously engage an inverted, half pallet conveyed into an input position in the delivery path of the pusher.

Conveying apparatus is positioned to convey inverted, half pallets with their stringer beams up and their deck boards lying thereunder in a direction generally normal to the direction of movement of the pusher into the aforesaid half pallet input position. Preferably, the input position to which half pallets are conveyed is below the deck board hopper, and switch means responsive to the conveying of an inverted half pallet into said input position actuates the pusher to deliver the half pallet and a second set of deck boards therewith into nailing position in the nailing machine.

Return conveyor means may be utilized as disclosed herein in conjunction with the aforesaid side feed conveyor apparatus and pusher means to make double deck pallets with a single nailing machine applying both sets of deck boards. In accordance with this method of making double deck pallets, a first set of deck boards is nailed to one side of a plurality of spaced apart stringer beams pulled through a nailing machine by the abovementioned side mounted conveyors. The resulting half pallet is flipped over to an inverted position with its stringer beams directed up. It is then recycled by return conveyor means to the aforesaid side feed conveyor apparatus by means of which it is carried to said input position. The above described pusher then delivers the inverted half pallet back into the same nailing machine under a second set of deck boards simultaneously carried forward into nailing position by the pusher.

These and other objects and advantages of my invention will be readily understood by reference to the accompanying drawings wherein like reference numerals have been used to designate like elements throughout the several views.

DESCRIPTION OF THE PREFERRED EMBODIMENT

Figure 1:
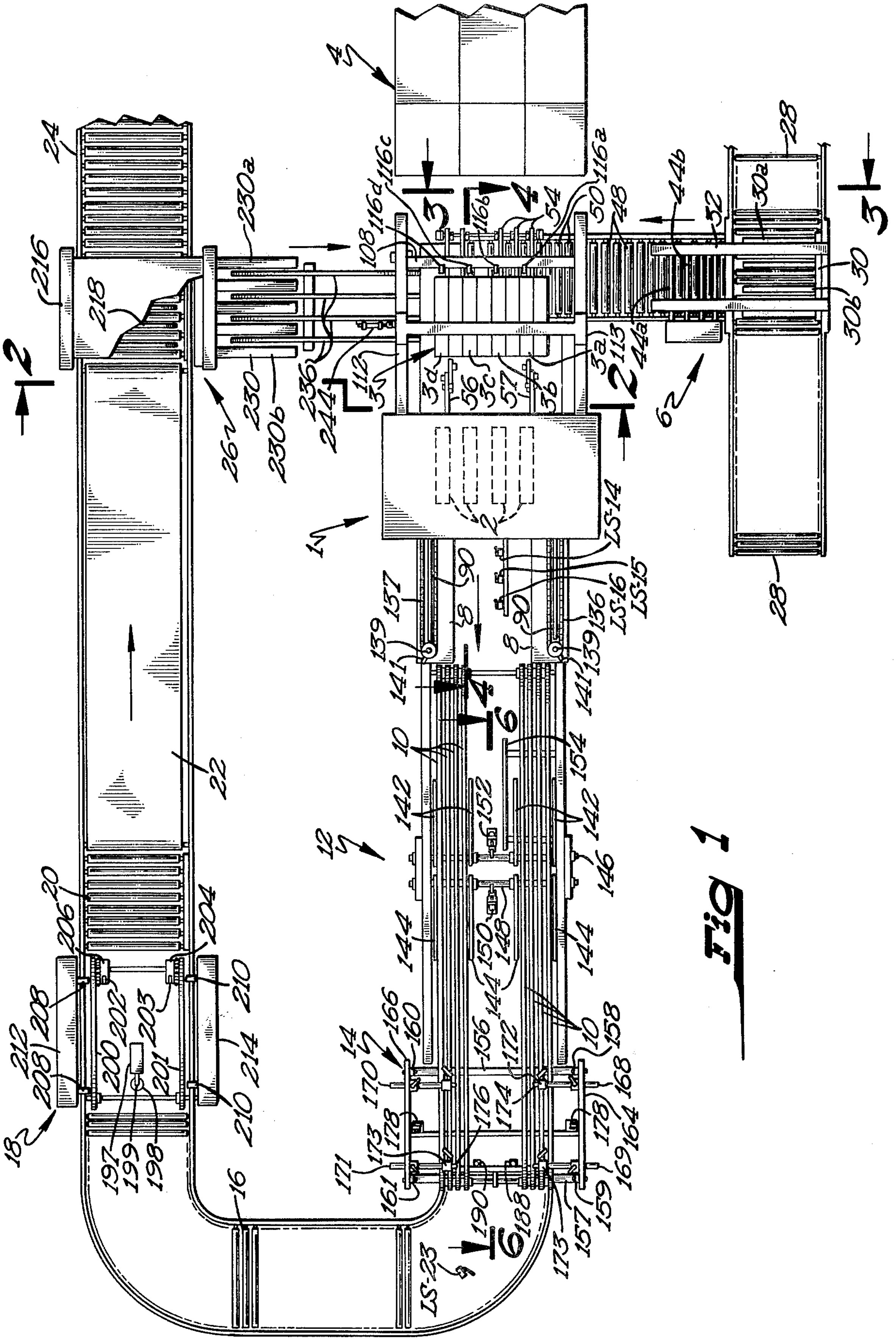
FIG. 1 is a top, plan view showing the pallet nailing and handling system of this invention.

Referring now to the drawings, I have shown in FIG. 1 a general layout of the pallet nailing system of this invention. Reference numeral 1 indicates a pallet nailing machine having a plurality of laterally spaced nailing heads 2. The nailing machine is of well known construction as described below. A deck board feed hopper 3 having a plurality of laterally spaced deck board storage compartments is positioned on the input side of nailing machine 1. Four of such deck board storage compartments are indicated by reference numerals *3a*, *3b*, *3c* and *3d*. Deck boards are initially stored in piles 4 prior to being loaded into hopper 3. Stringer beams to which the deck boards are nailed are initially fed into the system on the input side of nailing machine 1 by a stringer beam feed section generally indicated by reference numeral 6. The direction of material flow through nailing machine 1 is indicated by the directional arrow in FIG. 1. A slotted side table 8 extends beyond nailer 1 on the output side thereof. Pallets under construction are supported as they are conveyed through the nailing machine on split or slotted table 8. Conveying chains 10 receive either half pallets having a single deck or double deck pallets from slide table 8 and convey them for further processing. A flipper station, preferably incorporating a flipper mechanism 12, is utilized to flip half or single deck pallets over to an inverted position for either nesting and stacking or for the nailing of a second set of deck boards thereon in accordance with production requirements. Beyond flipping station 12 in the direction of pallet movement is a pallet nester 14. This nesting apparatus is utilized in a manner hereinafter set forth to nest single deck pallets in pairs for stacking and shipment.

A conveyor, preferably in the form of a gravity roller conveyor, moves pallets received from conveying chains 10 or nester 14 around to a stacker 18. Stacker 18 operates in a manner hereinafter described to stack either half pallets, nested single deck pallets, or double deck pallets, one on top of the other in predetermined numbers. Gravity rollers 20 receive stacks of pallets on the output side of stacker 18, from which stacks of pallets are moved by power driven belt conveyor 22 to a final roller conveyor 24. Gravity rollers 20 are adapted to be power driven for control movement of stacks of pallets as required. Finished pallets of either single deck or double deck construction are conveyed on gravity roller 24 to a shipping area. Alternatively, conveying apparatus indicated by reference numeral 26 may be utilized as set forth below to return half pallets to an input position on the input side of nailing machine 1 from which they can again be conveyed through the same nailing machine for the nailing of a second set of deck boards in place thereon to make double deck pallets.

Figure 7:
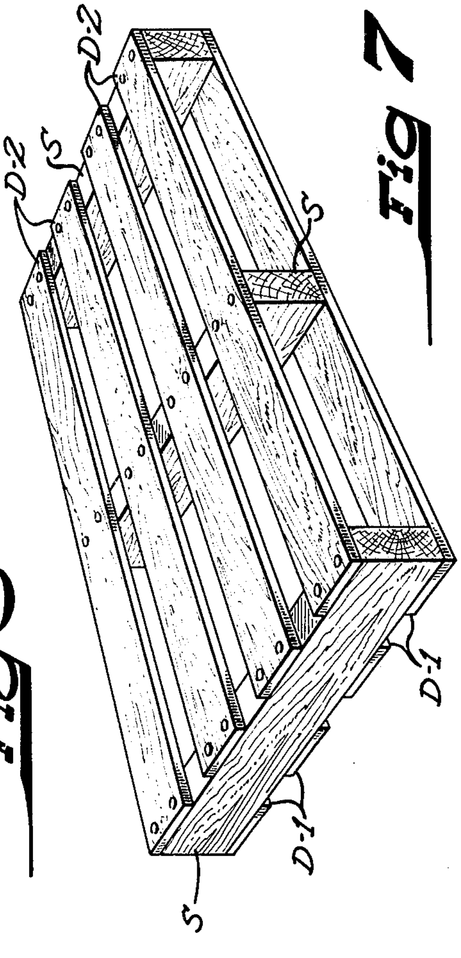
FIG. 7 is a perspective view of a completed double deck pallet made in accordance with the nailing system of this invention.

FIG. 7 shows a completed, double deck pallet having two sets of deck boards D-1 and D-2 nailed to opposite sides of a plurality of parallel, spaced apart stringer beams S. The deck boards are nailed transversely of the stringer beams as shown. If only a single deck pallet is desired, the bottom set of deck boards D-2 is not applied. A partially assembled pallet having a first set of deck boards thereon, and to which a second set of deck boards is to be applied in order to make a double deck pallet is referred to herein as a half pallet.

Figure 3:
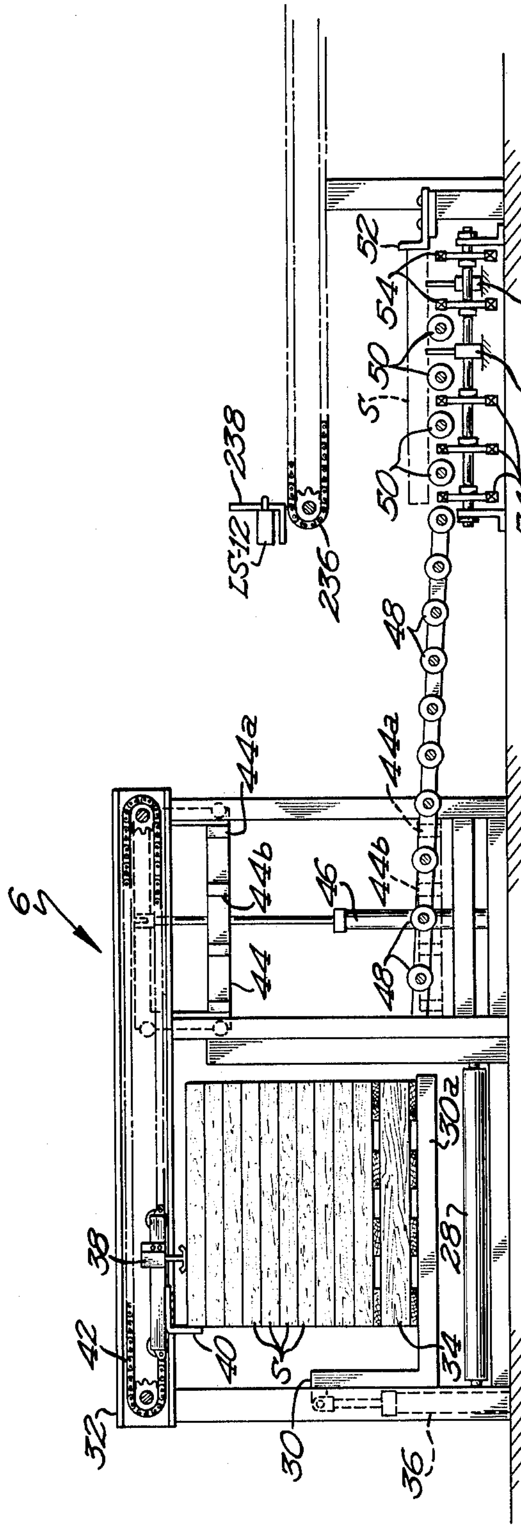
FIG. 3 is a vertical section view taken along lines 3—3 of FIG. 1 and showing the stringer beam infeed arrangement.

Referring now to FIGS. 1 and 3, I have indicated generally by reference numeral 6 the apparatus utilized to convey stringer beams into a nailing position in nailing machine 1. Pallets carrying stacks of stringer beams S are placed on a roller conveyor 28 by means of which they are conveyed into position for lifting above an elevator device 30. Elevator 30 is supported on a frame structure 32 and is comprised of a plurality of horizontally extending lift forks or arms, two of which are indicated by reference numerals *30a* and *30b* in FIGS. 1 and 3. When a stack of stringer beams is moved into lift position within lift frame 32 on roller conveyor 28, elevator 30 will be in its lowermost position with its lift arms *30a*, *30b* positioned below rollers 28. In FIG. 3 a stack of stringer beams S are shown on a conveying pallet 34 with elevator 30 in a partially raised position. A power cylinder 36 is utilized to raise and lower elevator 30. The upward movement of elevator 30 is limited and controlled by a load height sensor 38. When sensor or limit switch 38 is tripped, a pusher 40 is carried forward by an endless chain 42 to which it is attached. Pusher 40 carries one roll of stringer beams at a time unto a stringer beam elevator 44 which is also supported on frame structure 32. Elevator 44 also has a plurality of forks or arms, two of which are indicated by reference numerals *44a* and *44b*, on which a roll of stringer beams is supported. A power cylinder 46 lowers elevator 44 to a position where its lift arms will be below gravity rollers 48, as indicated in phantom lines in FIG. 3. In this manner one roll of stringers at a time is dropped onto gravity rollers 48, from which the roll of stringer beams advances to jump rollers 50. A stop plate 52 is positioned as shown in FIG. 3 to stop a roll of stringers at a location on jump rollers 50 directly over a set of conveyor chains 54. Chains 54 extend generally normal to the direction of travel of stringer beams on rollers 48 and 50, and serve to convey stringers to a pickup position for gripping by a pair of stringer placement arms 56 and 57. The tripping of a limit switch LS-20 positioned adjacent stop plate 52, by the movement of a row of stringer beams thereagainst actuates power means not shown to lower jump rollers 50 down between conveyor chains 54 to place a row of stringer beams thereon. An additional limit switch LS-21 is positioned adjacent the discharge end of conveyor chains 54. Switch LS-21 will be released when the last stringer beam in a row is conveyed onto lift arms 56-57. Both limit switches LS-20 and LS-21 must be released before jump rollers 50 automatically raise above conveyor chains 54 to receive another row of stringer beams.

Stringer placement arms 56 and 57 are utilized to lift stringer beams one at a time as they are received from conveyor chains 54 and deliver them to a nailing position in nailing machine 1. As noted above, the nailing machine is of a conventional design incorporating a plurality of laterally spaced nailing heads 2 positioned above a horizontally extending anvil 58. Such nailing machines are well known and are disclosed in substantial detail in U.S. Pat. Nos. 2,856,606 and 3,557,439. Nail heads 2 are reciprocally movable in a vertical direction with respect to anvil 58, and push rods 60 movable with heads 2 serve to drive nails from nail chucks 62 into deck boards and stringer beams placed in nailing position between nailing heads 2 and anvil 58. Nails are fed into chuck 62 through tubes 64.

Figure 4:
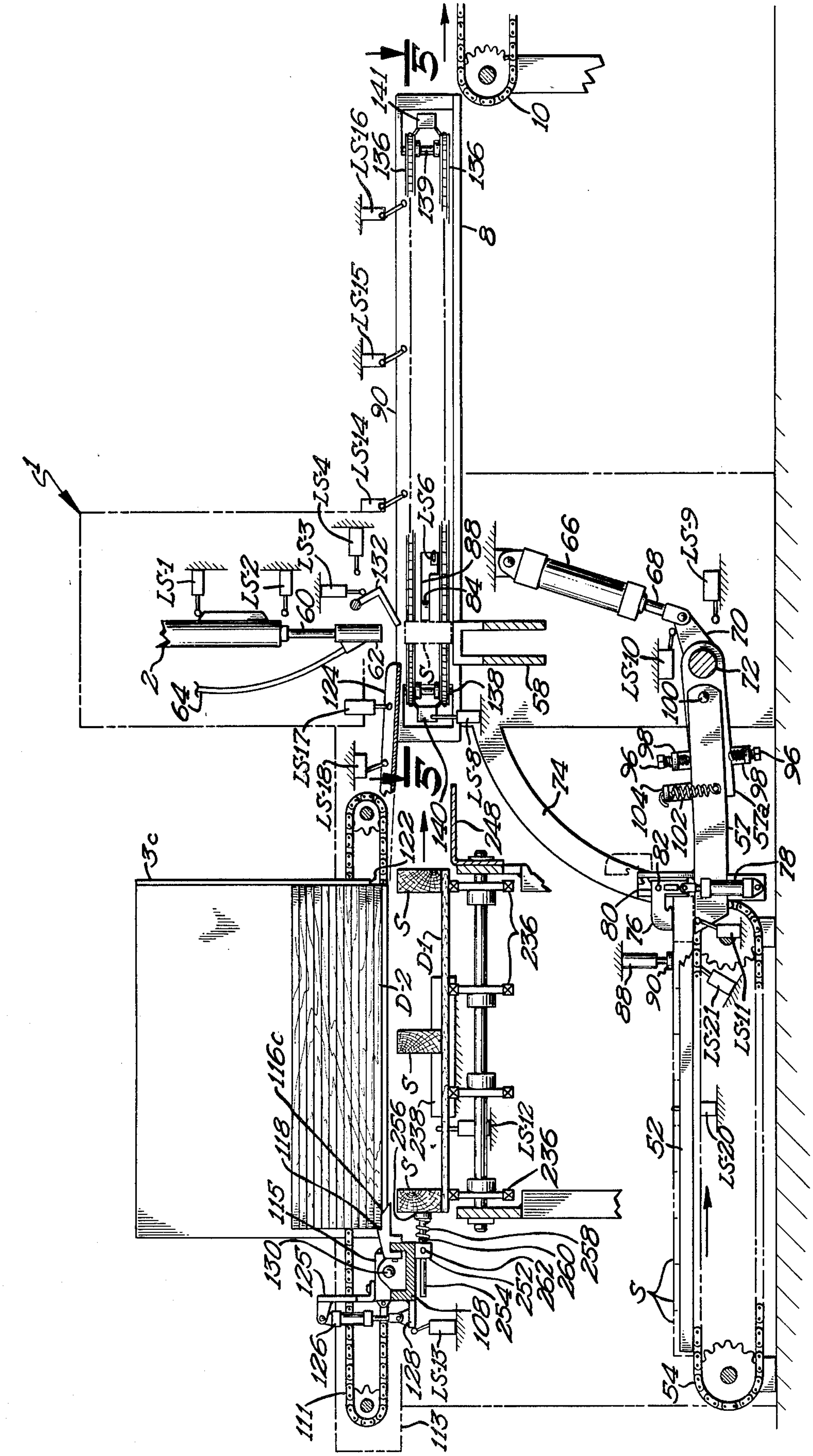
FIG. 4 is a vertical section view taken along lines 4—4 of FIG. 1 and showing the conveying and handling apparatus for carrying stringer beams and deck boards into and through a nailing machine.
Figure 5:
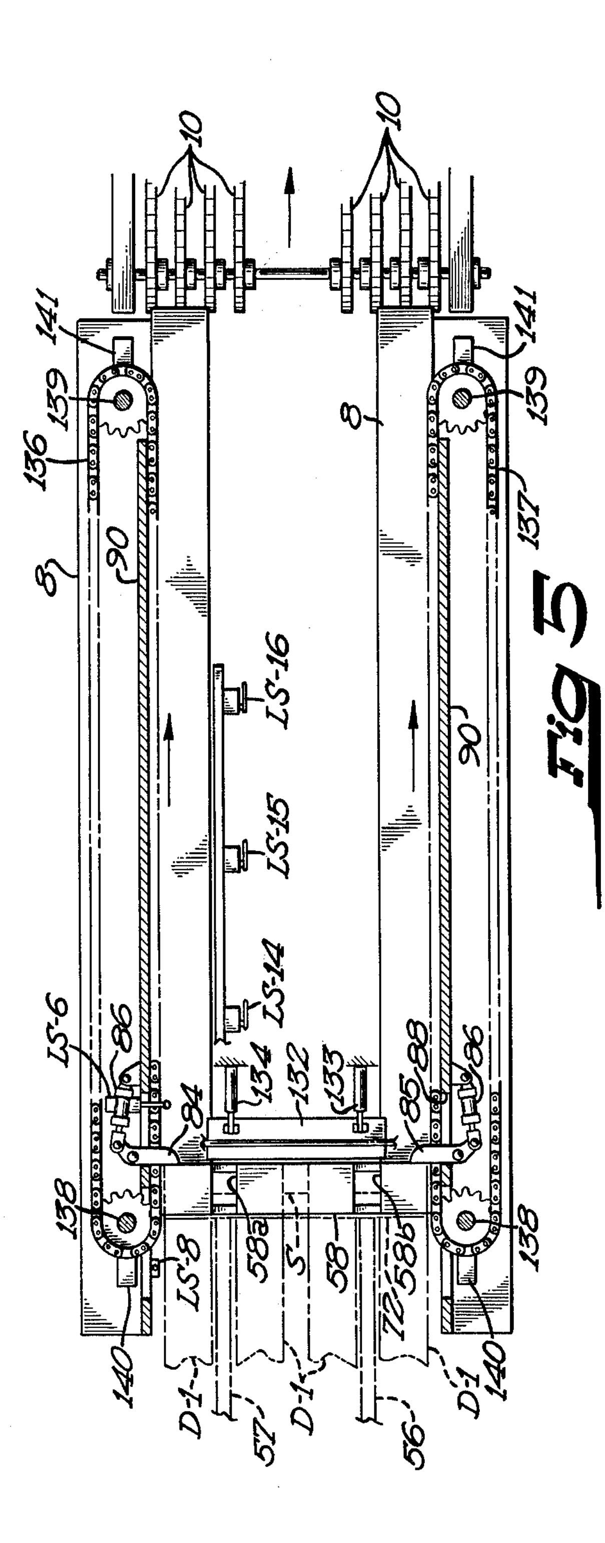
FIG. 5 is a top, plan view taken along lines 5—5 of FIG. 4 and showing the side mounted conveyors for carrying stringer beams and attached deck boards through the nailing machine.

Stringer placement arms 56 and 57 are actuated for swinging movement by a common power cylinder 66 having a reciprocal movement 68. A crank arm 70 extending from the horizontal shaft 72 is attached to the outer end of piston 68. Stringer placement arms 56 and 57 are supported on cross shaft 72 at laterally spaced locations for rotary movement therewith, as is indicated in FIGS. 1 and 4. The extension of piston 68 causes shaft 72 to rotate counterclockwise and thereby swing stringer arms 56 and 57 upwardly to a position adjacent anvil 58 for placing one stringer beam at a time thereon. The arcuate path of arms 56 and 57 is defined by curved guides 74 which serve to restrain and guide the outer ends of stringer beams being lifted into nailing position by arms 56 and 57. Each of the stringer placement arms 56 and 57 is provided at its outer end with a pivotal clamp 76 movable between an open position as shown in phantom lines in FIG. 4 and a closed, clamping position by means of a power cylinder 78. A bifurcated clamp guide bracket 80 is slotted and recessed to provide guide tracks for clamp pivot pin 82, to which cylinder 78 is attached. Two limit switches are positioned adjacent the output side of conveyor chains 54, near each of the stringer placement arms 56 and 57 at the stringer damping position thereof. One of such limit switches LS-11 is shown in FIG. 4. Both of these limit switches must be tripped by the movement of a stringer from chain conveyor 54 onto the pickup end of lift arms 56 and 57 as shown in FIG. 4 before cylinders 78 are actuated to swing clamps 76 into their clamping positions. One of the stringer clamps 76 is shown in its clamping position in engagement with a stringer on arm 57 in FIG. 4. The use of the two limit switches at the stringer clamping position ensures that both ends of a warped stringer will be properly positioned at both stringer placement arms 56 and 57 before clamps 76 are actuated. A pair of retractable stops 84 and 85 are positioned above transfer tables 8 at the location shown in FIGS. 4 and 5 adjacent the rear face of anvil 58. These stops are moved between an extended stop position as shown in FIG. 5 and a retracted position out of the path of stringer and pallet movement along cables 8 on the output side of nailing machine 1 by cylinders 86. In an operational sequence controlled by limit switches as hereinafter set forth, cylinders 86 operate to retract stringer stops 84 and 85 through slots 88 in upright table plates 90 and 91 after each nailing stroke. Stops 84 and 85 are in their extended, stop positions prior to each lifting stroke of stringer arm 56 and 57 to place the stringers in place on top of anvil 58. Stops 84 and 85 ensure that each stringer beam is properly placed on anvil 58 in line with nailing heads 2 and in proper position with respect to deck boards positioned thereover. A hold-down cylinder 92 having a reciprocal piston 94 as shown in FIG. 4 is utilized to hold the next following stringer on conveyor chain 54, following the stringer which is being clamped and lifted into nailing position by arms 56 and 57.

As one row of stringers at a time is fed onto conveyor chains 54 by jump rollers 50, the stringers are moved forward towards lift arms 56 and 57 by chains 54. At the beginning of a cycle for placing stringers in nailing position on top of anvil 58, hold-down cylinder 92 will have its piston 94 in the retracted, up position shown in FIG. 4 and arm clamps 76 will be open, with arms 56 and 57 in their down position as shown in FIG. 4 for receiving a stringer. Retractable stringer stops 84 and 85 will be in their extended, stop positions as shown in FIG. 5. When a stringer is delivered from conveyor 54 onto the receiving end of placement arms 56 and 57 in clamping position, the two limit switches at the stringer clamping position, one of which is shown as LS-11 in FIG. 4, will be tripped. Limit switch LS-10 adjacent stringer arm lift cylinder 66 will also be tripped at this time. As a result, hold-down piston 90 is extended to hold the next following stringer on the delivery end of conveyor chains 54. Power cylinders 78 will also be actuated by the tripping of limit switches LS-11, and clamps 76 will thereby be moved into clamping engagement with a stringer. Arms 56 and 57 are then swung upwardly to their stringer delivery positions by the extension of piston 68 of hydraulic cylinder 66. When arms 56 and 57 reach the top of their delivery strokes, a limit switch designated LS-9 will be tripped. This causes clamps 76 to open and release a stringer on top of anvil 58. It is to be noted that anvil 58 has a pair of slots 58*a* and 58*b* as shown in FIGS. 4 and 5, through which the clamping members 76 and associated guide brackets 80 pass when arms 56 and 57 reach the top of their delivery strokes. A stringer beam S is delivered on top of anvil 58 against retractable stops 84 and 85, and under nailing heads 2 for the nailing of deck boards thereto. After a nailing stroke, arms 56 and 57 are carried back down to their stringer receiving position by the retraction of piston 68 of cylinder 66. This causes limit switch LS-10 to be tripped. With limit switch LS-10 thus tripped, and limit switches LS-11 released, hold-down piston 94 is moved back up to its retracted position. Stringer placement arms 56 and 57 are then ready to receive another stringer, with clamps 76 open.

To compensate for warped stringers having uneven ends, and to ensure that both ends of stringers are swung up tightly against retractable stops 84 and 85, placement arms 56 and 57 are constructed of articulated segments and spring loaded. Both arms are of identical construction, reference being made to arm 57 as shown in FIG. 4. In addition to outer arm segment 57 having stringer clamp 76 thereon, the arm assembly also includes an inner arm segment 57*a*. Stop screws 96 are adjustably positioned in right angle stop brackets 98 affixed to arm section 57*a*. These stop screws limit the pivotal or swinging movement of outer arm segment 57 with respect to inner arm segment 57*a* about pivot point connection 100. Spring 102 extends between extension block 104 affixed to arm segement 57*a* and a pin 106 extending through and affixed to outer arm segment 57. If a warped stringer having uneven ends is received, outer placement arm segments 56 and 57 may swing about pivot pin connections 100 to their inner arm segments to the extent permitted by adjustable stop screws 96 in order to place both ends of a warped stringer tightly against retractable stops 84 and 85. Spring 102 ensures that the outer arm segments will be returned to a normal, rest position between the opposed stop screws 96.

For the purpose of delivering one set of deck boards at a time from deck board hopper 3 into nailing machine 1, I utilize pusher means which preferably takes the form of an elongated push bar 108. As may best be understood by reference to FIGS. 1, 2 and 4, push bar 108 is movable by pull chains 110 and 111 through a delivery path between a rest position at the rear end of deck board hopper 3 and a delivery position adjacent nailing machine 1. Push bar 108 is shown in its rest position in FIGS. 1 and 4. Chains 110 and 111 are contained within guide channels 112 and 113 and are attached to the opposite ends of push bar 108 by means of upright coupling plates 114 and 115. A plurality of pusher heads 116*a*, 116*b*, 116*c* and 116*d* are secured to push bar 108 at laterally spaced locations thereon. If pallets are to be made with four deck boards applied to stringer beams, four of such pusher heads will be utilized and will be attached to push bar 108 at laterally spaced locations in alignment with laterally spaced deck board storage compartments 3*a*, 3*b*, 3*c* and 3*d* for delivering four deck boards at a time therefrom. Each of the pusher heads is of identical construction, one of the head 116*d* being shown in side elevation in FIG. 4. Each of said heads includes an upwardly projecting deck board engaging segment 118 which projects upwardly into an elongated slot in the bottom of each of the deck board storage compartments 3*a*, 3*b*, 3*c* and 3*d*. Each of these deck board compartments also has a discharge opening 122 at its forward end through which the bottom deck board may be moved forwardly by one of the pusher heads on push bar 108. Guide troughs 124 extend forwardly from the bottom of each of the deck board compartments 3*a*, 3*b*, 3*c* and 3*d* in horizontal alignment with discharge openings 122. Power means, not shown, reciprocates pull chains 110 and 111 forwardly and backwardly to move push bar 108 though its delivery path between its rest position, and its forwardly moved delivery position. As push bar 108 moves through this path under deck board hopper 3, each of the upwardly projecting segments 118 on pusher heads 116*a*, 116*b*, 116*c* and 116*d* engages the bottom deck board in one of the storage compartments and pushes it forwardly out of front discharge openings 122 into guide troughs 124. As push bar 108 completes its delivery stroke adjacent to nailing machine 1, a set of four deck boards will be moved fowardly into guide troughs 124 with their forward ends in nailing position between nailing heads 2 and anvil 58. The deck boards will be positioned generally horizontally and normal to anvil 58. The front ends of the deck boards will be extended under nailing heads 2 for nailing to a stringer beam S positioned thereunder, with the rear ends of the deck boards still supported in troughs 124 until the deck boards are moved forwardly through nailing machine 1 for subsequent nailing to additional stringer beams as hereinafter described.

A tilt cylinder 126 is connected to push bar 108 by a stub block 128 extending from the rear face thereof as shown in FIG. 4. Push bar 108 is pivotal about a pivot pin connection 130 to support blocks at its opposite ends. When push bar 108 reaches the end of its delivery stroke adjacent nailing machine 1, the piston of cylinder 126 is retracted upwardly in order to tip push bar 108 in a counterclockwise direction as viewed in FIG. 4. This serves to rotate pusher heads 116*a*–116*d* to a lowered position wherein they will clear the bottom of hopper 3 as push bar 108 is retracted by chains 110 and 111 on its return stroke to its rest position at the rear end of hopper 3.

As each set of deck boards is fed forwardly into the nailing machine by push bar 108, the forward ends of the deck boards engage a deck board stop gauge 132. As is most clearly shown in FIGS. 4 and 5, stop gauge 132 is in the form of an elongated bar which extends transversely of the path of deck board movement on the output side of nailing machine 1. Stop gauge 132 is located above anvil 58 so that it will stop incoming deck boards under nailing heads 2 in a proper position of vertical alignment with the stringer beam placed thereunder by lift arms 56, 57 on top of anvil 58. A stringer S is shown in phantom lines in FIG. 4 in nailing position on top of anvil 58. Deck board stop gauge 132 is pivotal between the stop position shown in FIG. 4 and a rearwardly and upwardly swung displacement position wherein deck boards may clear it to move forwardly through the nailing machine. For this purpose a pair of power cylinders 133, 134 are attached to deck board stop gauge 132 as shown in FIG. 5. When cylinders 133, 134 are retracted, they swing stop gauge 132 upwardly in a clockwise direction to its displacement position.

For the purpose of moving stringer beams and their attached deck boards through nailing machine 1 to the output side thereof I utilize conveyor means which preferably takes the form of a pair of endless conveyors 136 and 137. Conveyor chains 136 and 137 are positioned on opposite sides of the nailing machine above transfer table 8 in horizontal planes and are guided about sprockets as shown. These conveyor chains rotate about vertical axes defined by sprocket shafts 138, 139, one of which for each chain is driven by a motor not shown. Affixed to each of the conveyor chains 136, 137 at spaced apart locations thereon are a pair of pull dogs 140, 141. These pull dogs are normally offset out of the path of stringer beam movement through the nailing machine and are movable into position with conveyor chains 136, 137 to engage the opposite ends of the first stringer beam of a pallet under construction and pull it forwardly to predetermined positions on the opposite side of nailing machine 1 for nailing additional stringer beams in place to either a first or second set of deck boards. Pull dogs 140, 141 serve as contact elements and are intermittently moved into position behind the lead stringer beam of a pallet under the nailing heads to engage the rear face of the opposite ends thereof and move it forwardly in a direction coextensive with the longitudinal disposition of deck boards nailed thereto to a series of predetermined positions where the deck boards affixed thereto will be properly located for successively nailing additional stringer beams thereto. Control means preferably comprising a series of limit switches LS-14, LS-15 and LS-16 spaced apart in the direction of pallet travel are responsive to contact by the lead or first stringer beam of a pallet under construction at predetermined locations to intermittently stop conveyor chains 136 and 137 for the successive nailing of additional stringer beams to the deck boards. If four deck boards are to be applied to either a single or a double deck pallet, three such limit switches will be utilized. After the first stringer beam is nailed to the deck boards, three additional stringer beams will be placed, one at a time, on top of anvil 58 by placement arms 56, 57 for nailing to the deck boards as the lead stringer beam is stopped intermittently by limit switches LS-14, LS-15 and LS-16. The entire operational sequence utilizing the various limit switches is described below. After a set of deck boards has been nailed to the desired number of stringer beams, conveyor chains 136 and 137 will be stopped at a location as shown in FIG. 5 wherein pull dogs 140 and 141 will be offset out of the path of stringer beam movement into nailing position above anvil 58 by arms 56 and 57. The use of side mounted conveyor chains 136, 137 with pull dogs 140, 141 thereon to engage the opposite ends of stringer beams permits the same nailing machine and conveyor chains 136, 137 to be utilized for pulling either a single deck or a double deck pallet through the nailing machine. By engaging the opposite ends of the lead stringer beam from the side with such side mounted conveyors, any interference with the first set of deck boards on a half pallet being processed through the same nailing machine for the attachment of a second set of deck boards thereto will be avoided.

Nailed pallets are pulled forwardly by conveyor chains 136, 137 over transver table 8 to positions where they are received on top of moving conveyor chains 10. From this point the pallets are processed in accordance with the desired production of single deck or double deck pallets. If single deck pallets having only one set of deck boards D-1 applied thereto as shown in FIG. 7 are to be produced and shipped, flipper apparatus 12 and nester 14 shown in FIGS. 1 and 6 are utilized to nest single deck pallets in pairs for stacking and shipment.

Figure 6:
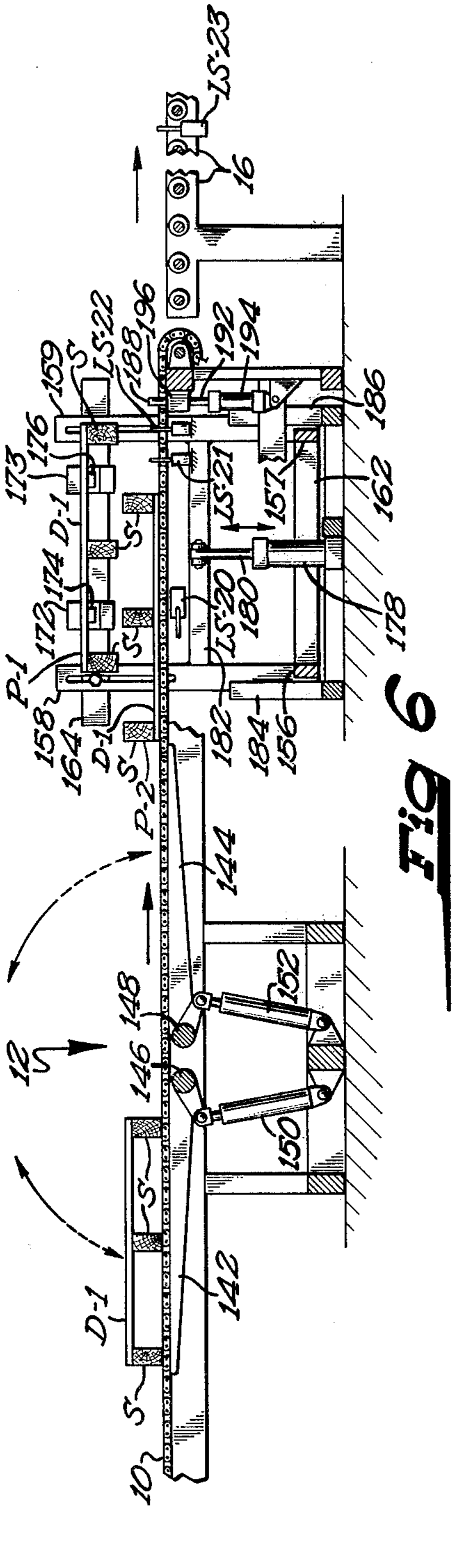
FIG. 6 is a vertical section view taken along lines 6—6 of FIG. 1 and showing the pallet flipper and nesting apparatus utilized for nesting single deck pallets.

As may best be understood by reference to FIGS. 1 and 6, fliper apparatus 12 is comprised of two sets of flipper arms 142 and 144 rotatable with their respective mounting shafts 146 and 148. These shafts are rotated in opposite directions by power cylinders 150 and 152 connected thereto by crank arms as shown in FIG. 6. The presence of a single deck pallet above flipper arms 142 is sensed by tripping device 154 which actuates cylinders 150 and 152. The extension of both of both of these cylinders serves to raise both sets of flipper arms 142 and 144. A single deck pallet having a single set of deck boards D-1 positioned on top of stringer beams S as shown in FIG. 6 will be raised by arms 142 and flipped over to be received on raised arms 144. Cylinders 150 and 152 are then retracted with the result that the flipped or inverted single deck pallet is lowered by arms 144 back on to conveyor chains 10. An inverted, single deck pallet with its stringer beams S facing upwardly and with its deck boards on the underside thereof is shown in FIG. 6 leaving flipper 12 and entering nester 14. For reasons set forth below with respect to the operation of nester 14, flipper 12 is utilized to flip every other single deck pallet to an inverted position to accomplish the nesting of single deck pallets in nester 14.

Nester 14 is utilized to nest single deck pallets in pairs with their stringer beams in opposed, interlocking relation. To this end, nester 14 is comprised of a lift frame as shown in FIGS. 1 and 6 having a pair of horizontal beams 156 and 157 connected between a pair of upright, generally U-shaped end frames. Each of the end frames is comprised of a pair of vertical posts 158, 159 and 160, 161, respectively, interconnected at their bottom ends by a base beam, one of which is shown at 162 in FIG. 6. Mounted on vertical posts 158, 159 and 160, 161 for vertical adjustment thereon, are side bars 164 and 166. Two pairs of lift rods 168, 169 and 170, 171 are horizontally supported on each of the side bars 164, 166 for horizontal adjustment inwardly and outwardly with respect to each other so as to be able to properly engage and lift pallets of varying size. Lift heads 172 and 173 on the inner ends of each of the pairs of lift rods 168, 169 and 170, 171 support horizontally projecting lift fingers 174 and 176 which are utilized to engage the underside of the deck boards of single deck pallets and lift them upwardly in the manner shown in FIG. 6. Lift fingers 174 and 176 are spring loaded within heads 172–175 to deflect in the direction of pallet travel. A power cylinder 178 is mounted on the floor under the nester apparatus with its piston 180 attached to a cross member 182 connected between at least one pair of the vertical posts 158, 159 of the lift frame assembly. Two such lift cylinders may be utilized, if desired. The upward extension of piston 180 as shown in FIG. 6 serves to raise the entire lift frame assembly comprised of horizontal beams 156, 157 and the end U-frame assemblies comprised of posts 158, 159 and 160, 161 together with their bottom cross beams 162. Two pairs of fixed, upright stanchions, one pair of which is shown at 184, 186 in FIG. 6, are utilized to guide lift frame posts 158, 159 and 160, 161 as they move upwardly and downwardly. A pair of vertically movable stops 188 and 190 are located near the output side of nester 14. These vertically movable stops are preferably in the form of end extensions on pistons 192 of vertically mounted power cylinders 194 as shown in FIG. 6. Pistons 192 are guided within fixed guide blocks 196.

The operation of the lift frame of nester 14 is controlled by four limit switches LS-20, LS-21, LS-22 and LS-23. These limit switches are positioned as shown in FIG. 6 in the direction of pallet travel from flipper 12 into nester 14. If single deck pallets are to be produced for shipment, flipper 12 and nester 14 are utilized to nest them in pairs. A first pallet P-1 having a single set of deck boards D-1 on top of stringer beams S is allowed to pass through flipper 12 into nester 14 without being flipped over or inverted. In comes into nester 12 with its stringer beams down and its deck boards D-1 on top thereof in the position as nailed. At the beginning of a nesting cycle, the lift apparatus will be down and stop pins 188, 190 will be up in their stop positions as shown in FIG. 6. As the lead stringer of pallet P-1 stops against pins 188, 190, it trips limit switch LS-22. This serves to open solenoid valves controlling the flow of pressurizing fluid to lift cylinder 178. Its piston 180 is then extended upwardly to raise the entire lift frame a predetermined height, with lift fingers 173 and 174 supporting pallet P-1 under deck boards D-1. Pallet P-1 is lifted to a sufficient height that a second pallet P-2 entering nester 14 will be able to move thereunder. The upward movement of pallet P-1 trips limit switch L-20 which serves to actuate cylinders 194 so as to retract pistons 192 and pull stop pin extensions 188 and 190 downwardly to a retracted position where they are out of the path of pallet movement on conveyor chains 10 through nester 14. The next single deck pallet P-2 coming out of the nailing machine is flipped over by flipper 12 to an inverted position prior to entering nester 14. It has its stringers extending upwardly with its deck boards D-1 on the bottom thereof as shown in FIG. 6. Limit switch L-21 will now be activated in a logic circuit. When it is tripped by the lead stringer beam of the second pallet P-2, it serves to actuate lift cylinder 178 to retract piston 180 and start pallet P-1 moving downwardly. Limit switch L-21 is so located in front of the lead stringer beam of raised pallet P-1 in a direction of pallet travel that the downwardly moving stringer beams of pallet P-1 will interleave with the corresponding stringer beams of inwardly moving pallet P-2 in tightly nested, vertically overlapping relation therewith. The downward movement of pallet P-1 and the forward movement of pallet P-2 are synchronized so that pallet P-1 will move downwardly to a position where its stringers tightly engage the corresponding stringers of pallet P-2. Since stop pins 188, 190 are retracted at this time, the pair of nested pallets P-1 and P-2 will move forwardly through the nester 14 on chains 10 to a position where they are received on roller conveyor 16 and moved around to stacker 18. As the pair of nested pallets P-1 and P-2 move along roller conveyor 16, they trip limit switch LS-23 located on the output side of nester 14. Limit switch LS-23 serves to actuate cylinders 194 to move their pistons 192 and stop pins 188 and 190 back upwardly to their stop positions where they will be operative to stop the next incoming, upright half pallet to repeat a nesting cycle. Limit switch LS-23 is located far enough beyond the output end of nester 14 along roller conveyor 16 that the largest pallet to be handled will have cleared nester 14 before stop pins 188 and 190 are raised to their stop positions.

Stacker 18 is of generally known construction and operates to stack either single or double deck pallets. Stacker feed chains 200, 201 receive pallets one at a time from roller conveyors 16. A lift head 197 positioned between chains 200, 201 is utilized to raise pallets for accumulating them in a stack. To this end a lift cylinder 198 has its piston 199 connected to lift head 197 for raising and lowering it. Retractable stops 202, 203 positioned near the output side of stacker 18 stop each pallet as it enters stacker 18 by engagement with the lead stringer beam thereof. Stops 202, 203 are mounted on hedged support plates 204, 106 which may be swung downwardly by power cylinders now shown to lower stops 202, 203 to a position where a stack of pallets may be moved outwardly from stacker 18 onto roller conveyor 20. Two pairs of retractable wedges 208, 210 are positioned on opposite sides of the stacker, and are movable horizontally inwardly and outwardly towards and away from each other by power cylinders contained within side housings 212, 214. Wedges 208, 210 are shown in their horizontally extended pallet support position in FIG. 1. As pallets come into stacker 18 they are stopped by stops 202, 203. A control device not shown serves to actuate cylinder 198 and lift the pallet upwardly by means of lift head 197 past wedges 208, 210. These wedges are extended horizontally after the pallet is raised above them and engage the underside of the pallet to hold it at a predetermined, elevated position. Each additional pallet entering stacker 18 is elevated in a similar way above wedges 208, 210 with each succeeding pallet supporting the pallet above it and with wedges 208, 210 under the bottom pallet of a stack of pallets. When a stack of pallets of predetermined number has accumulated, stops 202 and 203 are retracted to permit the stack to move outwardly onto roller conveyor 20 and thence onto belt conveyor 22. If single deck pallets are being produced, they move in a stack from belt conveyor 22 onto output roller conveyor 24, by which the stack is transported to a strapping and shipping area.

Figure 2:
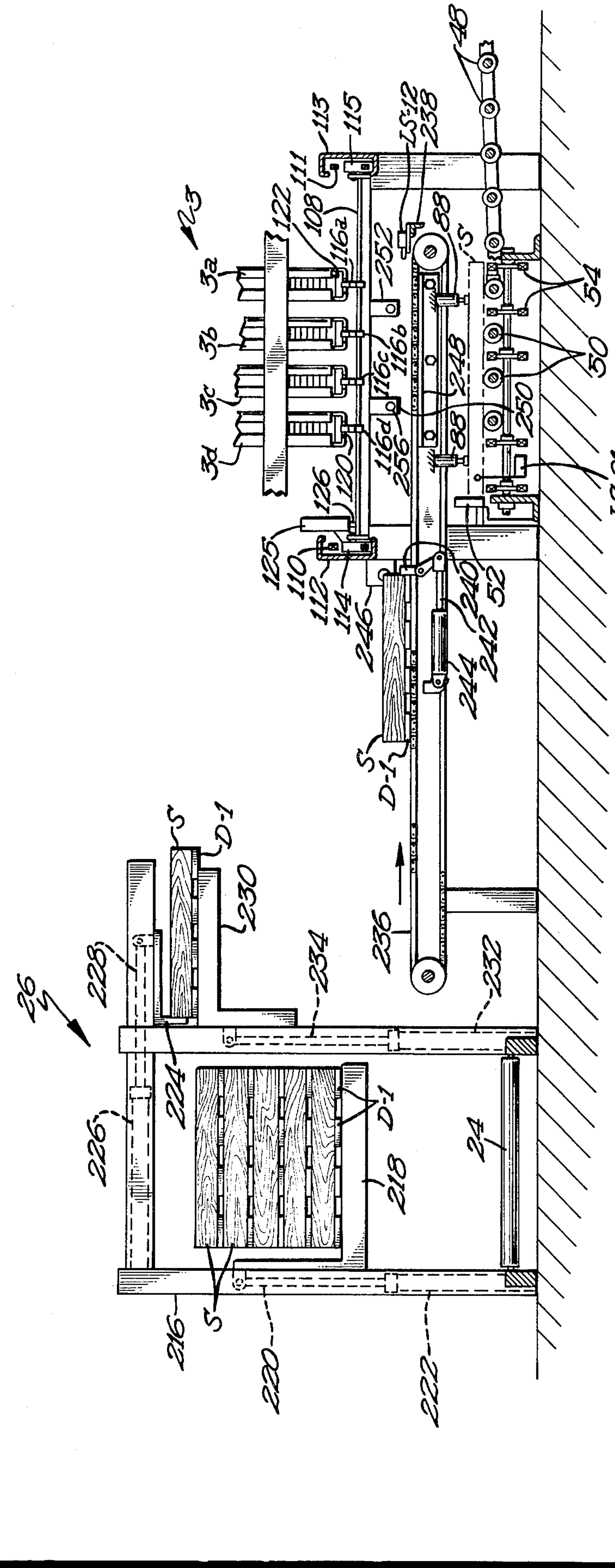
FIG. 2 is a vertical, section view taken along lines 2—2 of FIG.1 and showing the side feed conveying apparatus for delivering half pallets into position to be fed into a nailing machine.

If double deck pallets are to be manufactured, return apparatus generally designated by reference numeral 26 in FIG. 1 is utilized to return inverted half pallets one at a time into an input position on the input side of nailing machine 1. Such return apparatus is comprised of several pallet handling and conveying components. The half pallet return system is very similar to that described above with respect to FIG. 3 for feeding stringer beams into position for pickup by placement arms 56 and 57, and may best be understood by reference to FIGS. 1 and 2. A half pallet lift 218 supported on an upright frame structure 216 is utilized to lift stacks of half pallets received in stacks on rollers 24. Horizontally extending lift arms 218 are lowered below rollers 24 by piston 110 of a lift cylinder 222 to receive a stack of inverted, half pallets as shown in FIG. 2. When half pallets are being processed for the application of a second deck thereto to make a double deck pallet, they will be stacked in inverted positions as shown in FIG. 2 with their deck boards D-1 underlying their upwardly extending stringer beams S. Limit switches now shown control the lowering and raising of lift 218 as stacks of pallets are received on rollers 24. As lift 218 raises to controlled positions, half pallets are delivered one at a time therefrom by delivery beams onto a side feed conveyor 236. Such delivery means preferably comprises a pusher 224 and an elevator 230. Pusher 224 is in the form of a push plate which is extended and retracted to move half pallets one at a time from the top of a stack on lift 218 by a power cylinder 226. Piston 228 of power cylinder 226 is connected to pusher 224. As half pallets are pushed one at a time from the stack on lift 218 by pusher 224 in a lateral direction, they are received on top of elevator 230. This elevator has a plurality of lift arms or forks, two of which are indicated by reference numerals 230*a* and 230*b* in FIG. 1. Elevator 230 is raised and lowered by a power cylinder 232 having its piston 234 connected to elevator 230. After a half pallet is received on elevator 230 at its elevated position, from pusher 224, piston 234 is retracted to lower elevator 230 below side feed conveyor chains 236, which serves to drop a half pallet on top of chains 236. Chains 236 are disposed generally normal to the direction of movement of push bar 108 and serve to deliver inverted half pallets one at a time into an input position on the input side of nailing machine 1. This input position is defined by a stop bar 238 against which half pallets are delivered under deck board hopper 3 in the delivery path of push bar 108 by chains 236. An intermediate control stop 240 mounted in front of stop bar 238 in the path of pallet movement on conveyor 236 holds a half pallet as shown in FIG. 2 to one side of push bar 108 until it is back in its rest position and the previously delivered half pallet has been moved forwardly from its input position against stop bar 238. Control stop 240 is movable between the stop position shown in FIG. 2 and a retracted position by piston 242 of pallet power cylinder 244.

A slide plate 248 affixed to a side beam support for conveyor chains 236 receives half pallets and guides them as they are being delivered by half pallet infeed means from their input position against stop 238 to a nailing position in nailing machine 1 under nail heads 2. I have found it particularly effective and efficient to utilize contact means on push bar 108 as the half pallet infeed means. Such contact means takes the form of a plurality of pusher blocks 250, 252 supported in laterally spaced location on push bar 108 from the underside thereof, below deck board pusher heads 116*a*–116*d*, as most clearly appears in FIGS. 2 and 4. Supported within each of the push blocks 250, 252 are push rods 254 having piston-like push heads 256 affixed to the forward end thereof. Coil springs 258 are wound around push rods 254 and are contained between push heads 256 and retention pins 260 extending through rods 254. Push rods 254 may be longitudinally adjusted within push blocks 250, 252 to bring push heads 256 into proper position to engage the trailing stringer beam S of an inverted half pallet in its input position against stop bar 238 under deck board hopper 3. Set screw 262 as shown in FIG. 4 is then tightened to hold push bars 254 in their proper positions of adjustment.

As push bar 108 moves forward from its rest position at the rear end of hopper 3 to its delivery position adjacent nailing machine 1, push heads 256 will engage the trailing stringer of an inserted half pallet in its input position against stop bar 238 and carry the half pallet forwardly over transfer plate 248 to bring the lead stringer into nailing position on top of anvil 58. Simultaneously, segments 118 of pusher heads 116*a*–116*d* will pick up a second set of deck boards D-2 From the bottom of hopper 3 and carry them forward through guide troughs 124 to a nailing position on top of the stringers S of an inverted half pallet. The half pallet is then pulled through the nailing machine utilizing side conveyors 136 and 137 to nail the second set of deck boards to each of the trailing stringer beams in a controlled sequence hereinafter set forth. Push bar 108 is then returned to its rest position by its pull chains 110, 111. The return movement of push bar 108 to its rest position trips limit switch LS-13. At this time, limit switch LS-12 adjacent stop bar 238 will also be released by the delivery of a half pallet into the nailing machine. The tripping of switch LS-13 and the releasing of switch LS-12 is necessary to actuate cylinder 244 to pull control stop 240 down to its release position. This permits conveyor chain 236 to move the next half pallet positioned as shown in FIG. 2 forwardly against stop bar LS-12. A control device in the form of a photo delectric eye 246 positioned at control stop 240 will be actuated when there is no half pallet against control stop 240 to extend piston 242 of cylinder 244 to move control stop 240 back up to its stop position to control the infeed movement of another half pallet along conveyor chains 236.

In operation, single deck pallets are manufactured by feeding one set of deck boards and stringer beamss into nailing machine 1. Deck boards ae fed from hopper 3 into the nailing machine, utilizing push bar 108 and push heads 116*a*–116*d* thereon in the manner described above. If a pallet having four deck boards is to be made, four deck boards at a time are fed forwardly from hopper storage compartments 3*a*–3*d* as push bar 108 is moved forwardly on its delivery stroke by chains 110 and 111. As the deck boards are fed forwardly through outlet guide throughs 124 into nailing position over anvil 48, limit switches LS-17 and LS-18 are tripped. The movement of the forward edges of the deck boards against deck board back gauge 132 pivots this back gauge bar upwardly and rearwardly thereby tripping limit switch LS-3 as shown in FIG. 4. Limit switch LS-3 controls the solenoid valves in the fluid supply lines to power cylinders or fluid motors operating pull chains 110, 111 to stop the forward movement of push bar 108 on its delivery stroke. As deck boards are moved forwardly out of hopper 3 through delivery troughs 124 into the nailing machine, limit switches LS-17 and LS-18 will also be tripped. When the trailing ends of the deck boards D-1 clear limit switch LS-18 during the nailing process, a solenoid valve FS-12 shown in the schematic wiring diagram of FIG. 8 in step 4 opens to permit the flow of pressurizing fluid to tilt cylinder 126. The actuation of tilt cylinder 126 causes the forward end of push bar 108 to tilt downwardly so as to be able to clear the bottom of hopper 3 on its return stroke, which is also initiated by the releasing of limit switch LS-18. Push bar 108 again trips limit switch LS-13 as it reaches the end of its return stroke behind deck board hopper 3. Push bar 108 cannot be carried forward completely to deliver another set of deck boards into nailing machine 1 by means of pull chains 110, 111 until limit switch LS-13 is tripped and LS-17 is released by the complete, forward movement of the previous set of deck boards through the nailing machine.

Figure 8:
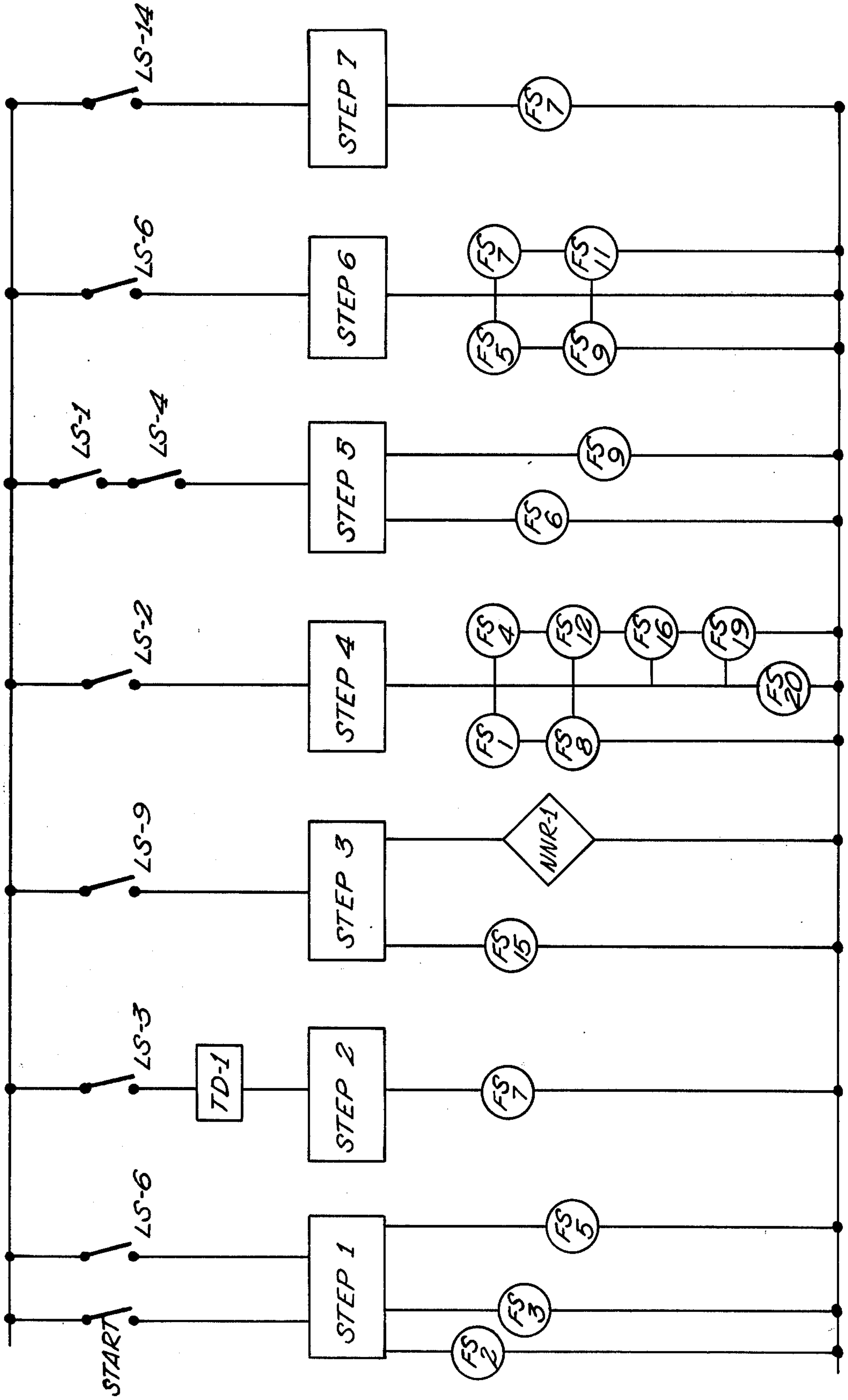
FIG. 8 is a schematic wiring diagram showing the control arrangement for the nailing process of this invention.

Simultaneously, with the feeding of deck boards into nailing machine 1 from hopper 3, stringer beam feed section 6 will be operating to bring a roll of stringer beams S into position on stringer feed chains 54 as described above with respect to FIGS. 3 and 4. After a first set of deck boards is positioned with its leading ends on top of anvil 58, stringer placement arms 56, 57 will operate in the manner described in conjunction with their stringer clamps 76 to position a first stringer beam on top of anvil 58 under the leading end of the first set of deck boards D-1. At the start of a nailing cycle for nailing a first deck in place as illustrated in the schematic wiring diagram of FIG. 8, deck board back gauge 132 will be swung downwardly to its deck board stop position as shown in FIG. 4. This is accomplished by the actuation of cylinders 133, 134 through solenoid valve FS-2. As indicated in step 1 of FIG. 8, solenoid valves FS-3 and FS-5 will also be actuated at this time. Solenoid valve FS-3 controls the flow of pressurizing fluid to a fluid motor or power cylinder to advance pull chains 110, 111 for deck board push bar 108. Solenoid FS-5 operates to actuate power cylinders 86 as shown in FIG. 5 to extend retractable stringer stops 84, 85 to their stop positions. In step 2 of the first deck nailing procedure as shown in FIG. 8, limit switch LS-3 will be tripped by the inward movement of a first set of deck boards as noted above. This serves to stop deck board feed chains 110, 111. Also, at this time, solenoid FS-7 is actuated to extend cylinders 66 thereby raising stringer placement arms 56, 57 to place a stringer beam S in place on top of anvil 58 against stops 84, 85. In step 3, limit switch LS-9 is tripped by the extension of stringer placement cylinders 66. Also, in this step, solenoid valve FS-15 is actuated. Valve FS-15 controls the flow of fluid to stringer clamp cylinders 78, which are thereby extended to open clamps 76 and release a stringer beam on top of anvil 58. With limit switches LS-3 and LS-9 both tripped, step 4 is initiated. In this step, nailing heads 2 are moved downwardly in a first nailing stroke to drive nails through the leading end of a first set of deck boards and into the lead stringer beam of a pallet. The downward movement of nailing heads 2 trips limit switch LS-2 during step 4. This serves to actuate solenoid valve FS-1 connected to power cylinders 133, 134 with the result that these cylinders operate to swing deck board back gauge 132 as shown in FIG. 5 upwardly and forwardly to a raised position where it clears the deck boards moving through the nailing machine and also trips limit switch LS-4. Solenoid valve FS-4 controlling the return of deck board feed chains 110, 111 is also actuated at this time as is solenoid FS-12 controlling the actuation of tilt cylinder 126. Solenoid valve FS-8 will have been actuated at this time to retract pistons 68 of cylinders 66 to swing stringer placement arms 56, 57 back downwardly to their stringer beam receiving position shown in FIG. 4. Solenoid valve FS-16 shown in step 4 operates to actuate cylinders 78 so as to again close stringer beam clamps 76 on the next stringer beam delivered onto placement arms 56, 57; and solenoids FS-19 and FS-30 control the raising and lowering of piston 90 of stringer beam stop cylinder 88 in the manner described above with respect to the feeding of stringer beams onto lift arms 56 and 57.

In step 5 the tripping of limit switch LS-1 by the automatic return of nailing heads 2 to their upwardly disposed positions, and the tripping of limit switch LS-4 by the upward swinging movement of deck board back gauge 132 causes side conveyor chains 136, 137 to be advanced. Also, in step 5, solenoid valve FS-6 will be actuated to extend power cylinders 86, thereby moving stringer stops 84, 85 to their retracted positions out of the path of stringer beam movement through the nailing machine. As side conveyor chains 136, 137 rotate in the directions indicated by the arrows in FIG. 5, one pair of pull dogs 140, 141 will come around behind the lead stringer beam and engage the opposite ends of the opposite ends of the back face thereof. The lead stringer beam with a first set of deck boards D-1 nailed thereto is thus pulled forwardly by chains 136, 137 along the top of slide tables 8 towards conveyor chains 10. Solenoid valve FS-9 shown in step 5 of FIG. 8 controls the operation of a fluid motor or power cylinders operating side conveyor chains 136, 137 in a forward direction.

As the lead stringer beam is pulled forwardly through the output side of the nailing machine by pull dogs 140, 141, it engages and trips limit switch LS-6. As is indicated in step 6 of FIG. 8, the closing of limit switch LS-6 actuates solenoid valve FS-5 to move stringer stops 84, 85 back inwardly to their stop positions through the operation of cylinders 86. At this time, in step 6, solenoid FS-7 will also be actuated to control the flow of pressurizing fluid to cylinders 66 in such a way as to swing stringer beam placement arms 56, 57 upwardly to place a second stringer beam on top of anvil 84 under the same set of deck boards D-1 that is being pulled through the nailing machine with the lead stringer beam. Solenoid valve FS-11 also shown in step 6 operates tilt cylinder 126 to return push bar 108 to its upward, level position after it has moved back to its rest position at the rear side of hopper 3. As chains 136, 137 and their pull dogs 140, 141 continue to pull the lead stringer beam and deck boards forwardly through the output side of the nailing machine, the lead stringer beam next engages limit switch LS-14. The tripping of limit switch LS-14 in step 7 operates to open solenoid valve FS-9, thereby stopping the movement of side conveyor chains 136, 137. With a second stringer beam now in place on top of anvil 58, the nailing process steps are repeated as the first set of deck boards D-1 is nailed to a second stringer beam. Side conveyor chains 136, 137 and their pull dogs 140, 141 then index forwardly again against the lead stringer beam causing it to successively trip limit switches LS-6 and LS-15. The tripping of limit switch LS-6 actuates placement arms 56, 57 to move a third stringer beam into place on top of anvil 58; and the tripping of LS-15 again stops the side conveyor chains 136, 137 for the nailing of the deck boards to the third stringer beam. The number of stringer beams to be used in making a pallet determines the number of limit switches LS-14, LS-15 and LS-16 to be utilized in the direction of stringer movement on the output side of the nailing machine. If only three stringer beams are to be utilized, LS-14 would not be operative, and the indexing of the deck boards under nailing heads 2 for nailing to second and third stringer beams would be controlled by limit switches LS-15 and LS-16.

If single deck pallets are being produced, the pallets with a single deck thereon are alternately flipped and nested by operation of flipper 12 and nester 14 in the manner described above. Nested pairs of single deck pallets are stacked one on top of the other in predetermined numbers in stacker 18 and then conveyed on output belt 22 to discharge roller conveyor 24 for strapping and shipping.

If double deck pallets are to be manufactured, the same nailing machine 1 may be utilized to nail a second set of deck boards D-2 onto the same stringer beams. In this process, the half pallets with a first deck applied thereto coming out of nailing machine 1, are all flipped over at flipping station 12 to an inverted position with their stringer beams facing upwardly and their deck boards D-1 lying on the underside thereof as shown in FIG. 2. Nester 14 is not operated at this time. The inverted half pallets with the first deck D-1 thereon are conveyed from flipper 12 around to stacker 18 where they are stacked one on top of the other in predetermined numbers and then conveyed by roller conveyor 20 and belt conveyor 22 onto roller conveyor 24 within lift frame 216. Stacks of half pallets accumulating in stacker 18, and on roller conveyor 20, are intermittently fed by belt conveyor 22 onto rollers 24 within lift frame 216. Half pallet lift 218 then raises one stack of half pallets at a time in controlled increments by use of limit switches not shown with pusher 224 serving to move one half pallet at a time from the stack on lift 218 onto elevator 230. Elevator 230 drops one half pallet at a time onto half pallet return conveyor 236 from which one half pallet at a time is fed into an input position against stop bar 238 in a controlled sequence, utilizing intermediate control stop 240 in the manner set forth above. Before the feeding of half pallets and a second set of deck boards into nailing machine 1 is commenced, lift arms 56, 57 and the associated stringer clamps 76 and stop cylinders 88 are deactivated. Each time that a half pallet is in place against the stop bar 238, limit switches LS-12 and LS-13 operate in the manner stated above to move push bar 108 forwardly. As push bar 108 comes forwardly on its delivery stroke, it simultaneously strips a second set of deck boards D-2 from the bottom of hopper 3 and moves a half pallet forwardly to a position where its lead stringer is on top of anvil 58 for nailing a second set of deck boards thereto. Spring loaded push heads 256 of half pallet push rods 254 permit rods 254 to shift forwardly within piston heads 256 against the resisting force of springs 258 as deck board pusher heads 116*a*–116*d* continue forwardly a slight distance to move the lead ends of the second set of deck boards D-2 into nailing position against stop gauge 132. The rear movement of stop gauge 132 again acts to trip limit switch LS-3 and thereby stop forward movement of push bar 108 on its delivery stroke in the same manner as described above with respect to the delivery of a first set of deck boards. The second set of deck boards is then nailed to the same set of stringer beams with the nailing sequence being controlled by limit switches in the same manner as described above. The only exception in the control sequence with respect to nailing a second set of deck boards in place is that limit switch LS-9 is not utilized to control the operation of nailing heads 2 on the nailing stroke, since cylinders 66 and lift arms 56, 57 will not be in operation at this time, Side mounted conveyor chains 136, 137 operate in the same manner as described above with their pull dogs 140, 141 to engage the rear face of the lead stringer and index it forward sequentially against limit switches LS-14, LS-15 and LS-16 to successfully nail the second set of deck boards to each of the stringer beams. By engaging the lead stringer beam from the side by means of pull dogs 140, 141 any interference with the first set of deck boards D-1 in pulling the pallet through the nailing machine is avoided. Completed, double pallets as shown in FIG. 7 having a first and second set of deck boards D-1 and D-2 nailed to stringer beams S are received from slide tables 8 on conveyor chains 10 from which they are moved around to stacker 18. Flipper 12 and nester 14 will be inoperative at this time. Stacks of double deck pallets formed in stacker 18 are intermittently moved by means of roller conveyor 20 and belt conveyor 22 onto output conveyor 24 from which they are conveyed into a strapping and shipping area. The half pallet return apparatus generally designated by reference numeral 26 and including lift 218, pusher 224, elevator 230, and side feed conveyor chains 236 are deactivated after the last accumulated half pallet is fed back into the nailing machine for the application of a second deck thereto. Thus, as completed, double deck pallets move in stacks from stacker 18 on power belt 22, they will pass right through lift frame structure 216 on output conveyor 24.

It is to be noted that the use of the half pallet return apparatus in conjunction with a push bar 108 having push heads for simultaneously delivering a second set of deck boards and an inverted half pallet into a nailing machine reduces capital expenditure by permitting a single nailing machine to be utilized for nailing both the first and second set of deck boards in place to stringer beams for making double deck pallets. However, the aforesaid side feed conveyor chains 236 and their associated controls may be utilized in the manner disclosed herein in combination with push bar 108 to feed a second set of deck boards and half pallets into a second or separate nailing machine if desired. The same pusher apparatus may be effectively utilized to simultaneously feed a second set of deck boards and a half pallet into any nailing machine for the application of a final or second set of deck boards in the course of manufacturing double deck pallets.

It is also to be noted that some type of restraining or brake device may be utilized on the output side of nailing machine 1 against the lead stringer beam to ensure that the stringer beam does not continue to move forwardly past the respective limit switches LS-14, LS-15 and LS-16, after being released by pull dogs 140, 141 when chains 136 and 137 are stopped. This will avoid having deck boards move forwardly beyond the desired index or control point where they are to be nailed to subsequent stringer beams.

I anticipate that various other changes may be made in the size, shape, construction and operation of the pallet nailing and nesting apparatus disclosed herein without departing from the spirit and scope of my invention as defined by the following claims.

I claim:

1. Apparatus for manufacturing a double deck wooden pallet having parallel, spaced apart stringer beams with deck boards affixed transversely to opposite sides thereof comprising:

- a nailing machine with an input side and an output side having an anvil and a plurality of laterally spaced nailing heads above said anvil, and means for vertically positioning said nailing heads and said anvil relative to each other in cooperative relationship for nailing material positioned therebetween;
- a deck board hopper on the input side of said nailing machine for storing a plurality of deck boards, said hopper having a plurality of laterally spaced compartments to contain a plurality of laterally spaced stacks of deck boards, each of said compartments having an elongated contact opening in the bottom thereof, and a discharge opening in the front end thereof;
- stringer beam placement means operative to position stringer beams under deck boards transversely thereof in nailing position between said nailing heads and said anvil;
- pusher means for moving a predetermined number of deck boards at a time from said hopper into laterally spaced nailing positions generally normal to said anvil between said nailing heads and said anvil for nailing a first set of deck boards in place, said pusher means being movable through a delivery path between a rest position at the rear end of said hopper and a delivery position adjacent said nailing machine, and said pusher means comprising an elongated member extending transversely of said delivery path and a plurality of pusher heads laterally spaced apart along the length thereof in alignment with said laterally spaced stacks of deck boards in said hopper, each of said pusher heads having an upwardly projecting deck board engaging segment which extends into one of said elongated contact openings in said hopper to engage the bottom deck board therein and deliver it out of one of said hopper discharge openings as said pusher means moves forwardly from said rest position to said delivery position;
- conveyor means operative to intermittently move a first stringer beam and first set of deck boards forwardly in a direction coextensive with the longitudinal disposition of said first set of deck boards out of the output side of said nailing machine to predetermined positions for nailing additional stringer means to said first set of deck boards transversely thereof in parallel, spaced apart relation with respect to each other and said first stringer beam to make a half pallet having a first deck;

a flipping station on the output side of said nailing machine for flipping half pallets over to an inverted position with said stringer beams up and said first set of deck boards lying under said stringer beams;

means for returning inverted, half pallets from the output side of said nailing machine to an input position on the input side of said nailing machine below said hopper in said delivery path of said pusher means, with said inverted, half pallets having their stringer beams extending transversely to the direction of extent of deck boards in their nailing position; and half pallet infeed means movable to engage inverted, half pallets in said input position and deliver them one at a time into a nailing position under a second set of deck boards inputted by said pusher means with the lead stringer beam thereof between said nailing heads and said anvil of said nailing machine, said half pallet infeed means comprising contact means on said pusher means below said deck board engaging segments positioned to contact the trailing end of an inverted, half pallet in said input position beneath said hopper, whereby said same pusher means moves deck boards from said hopper into nailing position to form either a first or second deck of a pallet and also delivers half pallets from said input position thereof into said nailing position for completing a double deck pallet.

2. Apparatus as defined in claim 1 wherein:

said half pallet contact means comprises a contact surface below said deck board engaging segments located to contact the trailing stringer of an inverted, half pallet in said input position under said hopper.

3. Apparatus as defined in claim 1 wherein:

said stringer beam placement means includes means for moving stringer beams one at a time from a supply source into said nailing position; and said conveyor means has contact elements thereon normally offset out of the path of stringer movement through said nailing machine and movable into position with said conveyor means to engage the opposite ends of the first stringer beam of a pallet under construction and intermittently index the stringer beam forwardly to predetermined positions for nailing additional stringer beams in place to either a first or a second set of deck boards.

4. Apparatus for manufacturing a double deck wooden pallet having parallel, spaced apart stringer beams with deck boards affixed transversely to opposite sides thereof comprising:

a nailing machine with an input side and an output side having an anvil and a plurality of laterally spaced nailing heads above said anvil, and means for verticalling positioning said nailing heads and said anvil relative to each other in cooperative relationship for nailing material positioned therebetween;

hopper means on the input side of said nailing machine for storing a plurality of deck boards;

pusher means for moving a predetermined number of deck boards at a time from said hopper means into laterally spaced nailing position generally normal to said anvil between said nailing heads and said anvil for nailing a first set of deck boards in place;

stringer beam placement means operative to position stringer beams under said deck boards transversely thereof in nailing position between said nailing heads and said anvil;

conveyor means operative to intermittently move a first stringer beam and first set of deck boards forwardly in a direction coextensive with the longitudinal disposition of said first set of deck boards out of the output side of said nailing machine to predetermined positions for nailing additional stringer beams to said first set of deck boards transversely thereof in parallel, spaced apart relation with respect to each other and said first stringer beam to make a half pallet having a first deck;

a flipping station on the output side of said nailing machine for flipping half pallets over to an inverted position with said stringer beams up and said first set of deck boards lying under said stringer beams;

half pallet return means for returning inverted, half pallets from the output side of said nailing machine to an input position on the input side of said nailing machine, with said inverted, half pallets having their stringer beams extending transversely to the direction of extent of deck boards in their nailing position, said half pallet return means comprising means for accumulating inverted, half pallets, and conveyor apparatus positioned to receive inverted, half pallets one at a time from said accumulator means and convey them in a direction generally normal to the direction of movement of said pusher means into said input position; and half pallet infeed means movable to engage inverted, half pallets in said input position and deliver them one at a time into a nailing position under a second set of deck boards inputted by said pusher means with the lead stringer beam thereof between said nailing heads and said anvil of said nailing machine.

5. Apparatus as defined in claim 4 wherein:

a retractable stringer stop is positioned at said stringer nailing position to fix placement of stringers under said nailing heads;

a deck board stop gauge is positioned adjacent said nailing heads in the path of deck board movement by said pusher means to initially stop and place incoming deck boards at a predetermined nailing position above a lead stringer; and switch means operative in response to the placement of the leading ends of deck boards against said deck board gauge to actuate said nailing machine.

6. Apparatus as defined in claim 4 wherein:

said pusher means is movable through a delivery path between a rest position and a forwardly disposed delivery position adjacent said nailing machine, and said half pallet return means is operative to return inverted, half pallets to said input position in said delivery path; and control means operative to initiate forward movement of said pusher means from said rest position to said delivery position in response to the placement of an inverted, half pallet at said input position.

7. Apparatus as defined in claim 4 wherein said half pallet return means further comprises:

delivery means positioned between said accumulating means and said conveyor apparatus for moving inverted, half pallets one at a time from said accumulator means unto said conveyor apparatus.

8. Apparatus as defined in claim 7 wherein said half pallet accumulating means comprises:

stacker means between said flipping station and said conveyor apparatus for accumulating inverted half pallets one on top of the other in stacks in predetermined numbers, and means for receiving stacks of pallets from said stacker for movement by said delivery means.

9. Apparatus as defined in claim 4, and further including:

stop means at said half pallet input position in the path of movement of half pallets on said conveyor apparatus; and switch means responsive to the return of a half pallet to said input position against said stop means to actuate said half pallet infeed means to deliver a half pallet from said input position to said nailing position.

10. Apparatus as defined in claim 9 wherein:

said half pallet infeed means comprises contact means on said pusher means, whereby said pusher means moves deck boards from said hopper into nailing position to form either a first or second deck of a pallet and also delivers half pallets from said input position thereof into said nailing position;

said pusher means is movable through a delivery path between a rest position and a forwardly disposed delivery position adjacent said nailing machine, and said input position to which half pallets are returned by said conveyor apparatus is in said delivery path of said pusher means where said half pallet contact means on said pusher means will contact half pallets in said input position.

11. Apparatus for manufacturing a double deck wooden pallet having parallel, spaced apart stringer beams with deck boards affixed transversely to opposite sides thereof comprising:

a nailing machine with an input side and an output side having an anvil and a plurality of laterally spaced nailing heads above said anvil, and means for verticalling positioning said nailing heads and said anvil relative to each other in cooperative relationship for nailing material positioned therebetween;

hopper means on the input side of said nailing machine for storing a plurality of deck boards;

pusher means for moving a predetermined number of deck boards at a time from said hopper means into laterally spaced nailing position generally normal to said anvil between said nailing heads and said anvil for nailing a first set of deck boards in place;

stringer beam placement means operative to move stringer beams one at a time from a supply source and to position them under said deck boards transversely thereof in nailing position between said nailing heads and said anvil;

conveyor means operative to intermittently move a first stringer beam and a first set of deck boards forwardly in a direction coextensive with the longitudinal disposition of said first set of deck boards out of the output side of said nailing machine to predetermined positions for nailing additional stringer beams to said first set of deck boards transversely thereof in parallel, spaced apart relation with respect to each other and said first stringer beam to make a half pallet having a first deck, said conveyor means having contact elements thereon normally offset out of the path of stringer movement through said nailing machine and movable into position with said conveyor means to engage the opposite ends of the first stringer beam of a pallet under construction and intermittently index the stringer beam forwardly to predetermined positions for nailing additional stringer beams in place to either a first or a second set of deck boards, and said conveyor means comprising a pair of endless conveyors disposed on opposite sides of said nailing machine in horizontal planes and movable about vertical drive axes to positions where said contact elements engage the opposite ends of the rear face of a stringer beam in said nailing position, whereby a first set of deck boards on a half pallet being conveyed through said nailing machine for the nailing of a second set of deck boards thereto will not interfere with the engagement of said contact elements with stringers;

a flipping station on the output side of said nailing machine for flipping half pallets over to an inverted position with said stringer beams up and said first set of deck boards lying under said stringer beams;

means for returning inverted, half pallets from the output side of said nailing machine to an input position on the input side of said nailing machine, with said inverted, half pallets having their stringer beams extending transversely to the direction of extent of deck boards in their nailing position; and half pallet infeed means movable to engage inverted, half pallets in said input position and deliver them one at a time into a nailing position under a second set of deck boards inputted by said pusher means with the lead stringer beam thereof between said nailing heads and said anvil of said nailing machine.

12. Apparatus for manufacturing either single or double deck wooden pallets having spaced apart stringer beams with deck boards affixed to one or both sides of said stringer beams transversely thereof comprising:

a nailing machine with an input side and an output side and having a plurality of laterally spaced nailing heads under which material to be nailed may be positioned;

stringer beam placement means operative to place stringer beams one at a time in a nailing position transversely of said nailing machine under said nailing heads;

retractable stop means on said nailing machine movable between a stop position to stop stringer beams under said nailing heads at said nailing position and a retracted position out of the path of stringer movement through said nailing machine; and side mounted conveyor means comprising a pair of endless conveyors having contact elements thereon normally offset out of the path of stringer movement through said nailing machine, said endless conveyors being disposed on opposite sides of said nailing machine in horizontal planes and being movable about vertical drive axes to positions where said contact elements engage the opposite ends of the rear face of a stringer beam in said nailing position to move said stringer beam forwardly out of the output side of said nailing machine in a direction coextensive with the longitudinal disposition of a set of deck boards nailed thereto, to predetermined positions for nailing additional stringer beams to said deck boards transversely thereof in spaced apart relation with respect to each other and said first stringer beam, whereby a first set of deck boards on a half pallet being conveyed through said nailing machine for the nailing of a second set of deck boards thereto will not interfere with the engagement of said contact elements with stringer beams.

13. Apparatus as defined in claim 12, and further including:

control means responsive to the movement of said first stringer to predetermined positions on the output side of said nailing machine to intermittently stop said conveyor means, whereby said contact element pulls said first stringer beam and deck boards nailed thereto forwardly intermittently to thereby index said deck boards under said nailing heads for the nailing of additional stringer beams thereto.

14. Apparatus as defined in claim 13 wherein:

said control means comprises a plurality of switch devices at spaced apart locations in the direction of pallet travel on the output side of said nailing machine responsive to contact by said first stringer at said predetermined positions to intermittently stop said conveyor means at predetermined locations of said deck boards for successive nailing of additional stringer beams thereto.

15. Apparatus as defined in claim 14 wherein:

said retractable stop means is intermittently moved from said retracted position to said stop position in response to the sequential actuation of a switch device by the movement of said first stringer beam to a predetermined position on the output side of said nailing machine.

16. A method of manufacturing double deck wooden pallets having spaced apart stringer beams with deck boards affixed transversely to opposite sides thereof comprising:

mechanically placing stringer beams one at a time in a nailing machine having an input side and an output side, with said stringer beams positioned under a first set of deck boards at predetermined positions with respect thereto, and nailing a first set of deck boards to one side of a plurality of spaced apart stringer beams transversely thereof to make half pallets;

flipping said half pallets over to an inverted position with said stringer beams up and said first set of deck boards lying under said stringer beams;

accumulating a plurality of inverted half pallets outputted by said nailing machine;

terminating the mechanical placement of said stringer beams in said nailing machine;

conveying accumulated, inverted half pallets one at a time back to an input position on the input side of said nailing machine;

pushing a second set of deck boards into said nailing machine; feeding said inverted half pallets back into said nailing machine from said input position with their stringer beams oriented transversely of said second set of deck boards for nailing thereto; and nailing second sets of deck boards to the opposite side of said stringer beams of said half pallets in said nailing machine to make double deck pallets.

17. The method as defined in claim 16 wherein:

each of said inverted half pallets is simultaneously fed into said nailing machine with a second set of deck boards by common pusher means.

18. The method as defined in claim 16 and further including:

stacking inverted half pallets and accumulating them in stacks; and conveying inverted half pallets one at a time from stacks to said input position on the input side of said nailing machine.

19. Apparatus for feeding half pallets and a second set of deck boards into a nailing machine with an input side and an output side and having a plurality of laterally spaced nailing heads above an anvil, said half pallets being comprised of a plurality of spaced apart stringer beams with one set of deck boards affixed transversely to one side thereof, comprising:

a deck board hopper on the input side of said nailing machine for storing a plurality of deck boards in laterally spaced relation, said hopper having a plurality of laterally spaced compartments to contain a plurality of laterally spaced stacks of deck boards, each of said compartments having an elongated contact opening in the bottom thereof, and a discharge opening in the front end thereof;

conveyor apparatus for moving inverted half pallets to an input position on the input side of said nailing machine below said hopper, with said inverted half pallets having their stringer beams up and said one set of deck boards lying thereunder, and with said stringer beams extending transversely to the direction of extent of deck boards stored in said hopper when said half pallets are in said input position;

pusher means movable through a delivery path between a rest position adjacent said deck board hopper and a delivery position adjacent said nailing machine, said half pallets being in said delivery path when in said input position, said pusher means being operative as it moves through said delivery path to engage a predetermined number of deck boards at a time and move them from said hopper into laterally spaced nailing position between said nailing heads and said anvil for nailing a second set of deck boards to a half pallet, and said pusher means having contact means thereon positioned to engage inverted, half pallets in said input position and deliver them one at a time into a nailing position under said second set of deck boards inputted by said pusher means with the lead stringer beam of said half pallet between said nailing heads and said anvil, whereby said same pusher means simultaneously delivers a second set of deck boards and an inverted, half pallet into nailing position in said nailing machine as said pusher means moves through said delivery path from said rest position to said delivery position;

said pusher means comprises an elongated member extending transversely of said delivery path and a plurality of pusher heads laterally spaced apart along the length thereof in alignment with said laterally spaced stacks of deck boards in said hopper, each of said pusher heads having an upwardly projecting deck board engaging segment which extends into one of said elongated contact openings in said hopper to engage the bottom deck board therein and deliver it out of one of said hopper discharge openings as said pusher means moves forwardly from said rest position to said delivery position; and said half pallet contact means is below said deck board engaging segments in position to contact the trailing end of an inverted, half pallet in said input position beneath said hopper.

20. Apparatus as defined in claim 19 wherein:

said half pallet contact means comprises a contact surface below said deck board engaging segments located to contact the trailing stringer of an inverted, half pallet in said input position under said hopper.

* * * * *

UNITED STATES PATENT AND TRADEMARK OFFICE

CERTIFICATE OF CORRECTION

PATENT NO. : 4,168,566

DATED : September 25, 1979

INVENTOR(S) : Thomas E. Streckert

It is certified that error appears in the above—identified patent and that said Letters Patent is hereby corrected as shown below:

Column 18, Claim 1, line 65, change "means" before "to said first" to -- beams --.

Column 21, Claim 4, line 56, change "verticalling" before "positioning" to -- vertically --.

Column 21, Claim 11, line 37, change "verticalling" before "positioning" to -- vertically --.

Signed and Sealed this

*Eleventh* Day of *December 1979*

[SEAL]

*Attest:*

SIDNEY A. DIAMOND

*Attesting Officer* *Commissioner of Patents and Trademarks*